United States Patent [19]

Kataoka

[11] Patent Number: 5,416,548
[45] Date of Patent: May 16, 1995

[54] PHOTOGRAPHIC FILM STRIP, PHOTOGRAPHIC FILM CASSETTE CONTAINING THE SAME, AND CAMERA FOR USE THEREWITH

[75] Inventor: Hideaki Kataoka, Kanagawa, Japan

[73] Assignee: Fuji Photo Film Co., Ltd., Kanagawa, Japan

[21] Appl. No.: 959,096

[22] Filed: Oct. 9, 1992

[30] Foreign Application Priority Data

Oct. 9, 1991 [JP] Japan .................... 3-290985

[51] Int. Cl.$^6$ .................... G03B 17/76; G03B 3/08
[52] U.S. Cl. .................... 354/275; 354/321
[58] Field of Search .................... 354/170, 171, 173.1, 354/212, 215, 217, 275, 105, 319, 321; 242/71.1

[56] References Cited

U.S. PATENT DOCUMENTS

| | | |
|---|---|---|
| 4,613,222 | 9/1986 | Takase et al., .................... 354/321 |
| 4,797,698 | 1/1989 | Uenara et al. .................... 354/275 |
| 4,834,306 | 5/1989 | Robertson et al. .................... 242/71.1 |
| 4,878,075 | 10/1989 | Cannon .................... 354/173.1 |
| 4,908,641 | 3/1990 | Fairman .................... 354/275 |
| 5,049,908 | 9/1991 | Murakami .................... 354/173.1 |
| 5,083,155 | 1/1992 | Kataoka et al. .................... 354/275 |
| 5,138,350 | 8/1992 | Cocca .................... 354/21 |
| 5,174,519 | 12/1992 | Oi et al. .................... 242/71.1 |
| 5,184,161 | 2/1993 | Egawa .................... 354/105 |
| 5,210,561 | 5/1993 | Nakai et al. .................... 354/297 |
| 5,212,512 | 5/1993 | Shiota .................... 354/319 |
| 5,218,392 | 6/1993 | Sakamoto et al. .................... 354/106 |

FOREIGN PATENT DOCUMENTS 0045428 2/1982 European Pat. Off. .
0095148 11/1983 European Pat. Off. .
435277 7/1991 European Pat. Off. .

Primary Examiner—M. L. Gellner
Assistant Examiner—Nicholas J. Tuccillo
Attorney, Agent, or Firm—Sughrue, Mion, Zinn, Macpeak & Seas

[57] ABSTRACT

A photographic film strip has a leader and a trailer, and is to be contained in a cassette having a rotatable spool. A first group of anchoring holes is formed in the trailer along a distal edge thereof, to be anchored on the spool. A second group of anchoring holes is formed at a position which is displaced from the first anchoring hole group toward the leader, and is utilized when the film strip is contained in a preserving cassette after development. In a preferred embodiment, a train of metering perforations are formed along a first lengthwise edge of the photographic film strip of regular intervals so as to be detected by a camera in order to detect positions of original frames. A plurality of take-up holes are formed in the leader, and adapted to being caught by a take-up spool of a camera. The take-up holes are out of alignment with the perforations. The camera has a cassette chamber. A fork is disposed in the cassette chamber over an exposure aperture, and is engaged with one spool end of the cassette on the side of the train of perforations, in order to rotate the spool. An area for recording data is formed on the photographic film strip along a second lengthwise edge which is opposite to the first edge. A magnetic recording head of the camera records data on to the recording area, and is disposed under the exposure aperture.

17 Claims, 13 Drawing Sheets

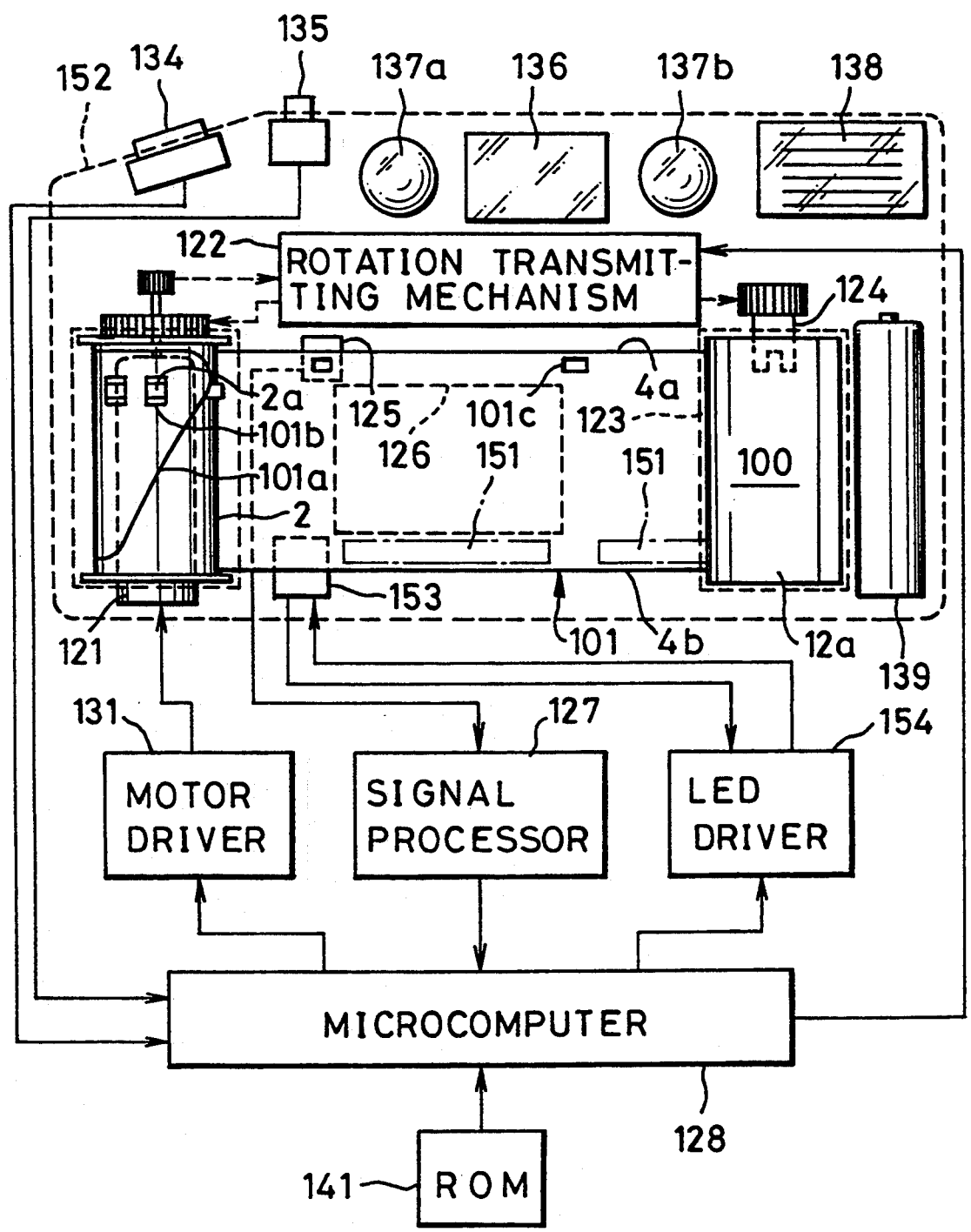

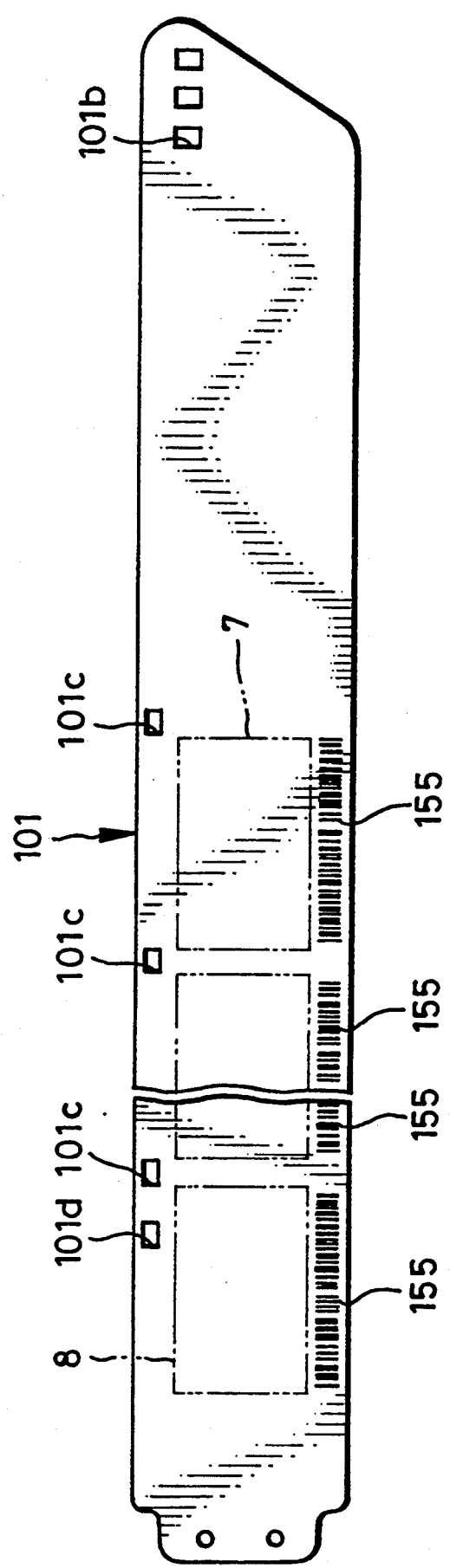

PHOTOGRAPHIC FILM STRIP, PHOTOGRAPHIC FILM CASSETTE CONTAINING THE SAME, AND CAMERA FOR USE THEREWITH

BACKGROUND OF THE INVENTION

1. Field of the Invention:

The present invention relates to a photographic film strip, a photographic film cassette containing the same, and a camera for use therewith. More particularly, the present invention relates to a photographic film strip which is convenient to handle, and a photographic film cassette and a camera for use therewith.

2. Description of the Related Art:

At present various types of photographic film strips (hereinafter referred to as film) are available. A 35 mm photographic film or 135-type photographic film, which is used with a 35 mm camera or a half-size camera, is contained in a cylindrically shaped photographic film cassette in the form of a roll on a spool which is rotatably contained in a cassette shell. A trailer, or inward-rolled end of the photographic film, strip is anchored on the spool. It is known to utilize anchoring claws formed on a spool core engaged with holes formed in the trailer to anchor the trailer to the spool. It is also known to form holes in a leader of the strip in a similar manner for anchoring the leader to a processing device, or the like.

Also, a return cassette or preserving cassette with which a developed strip of photographic film can be returned to a customer and preserved has been disclosed in Japanese Patent Laid-open Publication No. 3-179341 and Japanese Patent Application No. 3-193431, both being commonly assigned co-pending applications. (The former corresponds to U.S. Ser. No. 07/584,017, filed on Sep. 18, 1990 and patented as U.S. Pat. No. 5,083,155 on Jan. 21, 1992, and to German Patent Application No. P 40 29 555.9 filed on Sep. 18, 1990. The latter corresponds to U.S. Ser. No. 07/910,914 filed on Jul. 8, 1992, and to German Patent Application No. P 42 22 462.4 filed on Jul. 8, 1992.) The preserving cassette is constituted of a spool for winding the developed strip of photographic film, a cassette shell for rotatably containing the spool with the developed photographic film strip, and a structure for causing the photographic film strip to advance out of a passage defined in the cassette shell when the spool is rotated in the unwinding direction.

When the cassette containing the photographic film strip, after exposure, is forwarded to a photo laboratory, then an operator, in a preparatory step, splices a leader of the photographic film strip to a leader sheet, for which splicing tape is used. The leader sheet is provided with perforations adapted to handling in a photographic film processor. Prior to splicing, the photographic film strip is advanced from the cassette shell, and a tongue of its leader having a smaller width is cut off. The cassette with the leader sheet attached thereto is then loaded in a holder of the processor. The perforations in the leader sheet mesh with claws of a transporting mechanism of the processor, and the film is then transported to the inside of the processor. Transportation of the leader sheet pulls the photographic film strip out of the cassette. A cutter is actuated to cut the fully drawn photographic film strip away from the spool. The photographic film strip is then passed through relevant processing tanks of the processor, and automatically developed.

The developed strip of photographic film is then subjected to making photoprints in a photographic printer. To contain the developed photographic film strip in the above-mentioned preserving cassette, the leader sheet is removed and anchor holes are punched in the shortened trailer to anchor it on the spool of the preserving cassette. After anchoring the new holes on the spool, the developed photographic film strip is wound on the spool, and returned to the customer contained in the preserving cassette.

As suggested in U.S. Pat. No. 4,834,306, a known photographic film cassette includes photographic film strip positioned so that a leader does not protrude from a cassette shell prior to loading a camera with it. Such a cassette is easily loaded into a camera. A simple film-advancing mechanism of the camera is typically used with this type of cassette, and includes a construction which rotates a spool to unwind the photographic film strip, thereby causing the leader to move through a passageway for the photographic film strip and exist from the cassette. This type of photographic film strip has, as disclosed in U.S. Pat. No. 4,908,641, take-up holes formed in a leader to be engaged with claws of the take-up spool of the camera, and entering perforations, one for each original frame, regularly formed along one lengthwise edge of the strip for positioning each frame opposite an exposure aperture within the camera. An image of a subject to be shot is created in each frame on the photographic film strip.

It has also been proposed to provide the above-mentioned preserving cassette with a structure for causing the photographic film strip to advance outward when the spool is rotated in the unwinding direction, which is useful e.g. for automatically making extra prints.

U.S. Pat. No. 4,878,075 discloses a camera in which a photographic film strip having a magnetic recording area is used, and which is provided with a magnetic head that reads data concerning a type, sensitivity etc. of the photographic film strip from the recording area, and/or writes thereto photo-taking data concerning exposure of the photographic film strip to create frames. It is also known to provide the camera with a light emitting construction such as a light-emitting diode (LED) and thereby record photo taking data optically or photographically on the strip.

When using the above-mentioned preserving cassette for the photographic developed film strip, it is very difficult for an operator of the photo laboratory to punch anchoring holes in the shortened trailer of the photographic film strip. Should the holes not be in precise positions with respect to the claws of the spool, the trailer may fail to be anchored thereon. Should the photographic film strip be forcibly wound around the spool without positive anchoring of the trailer, the photographic film strip would be detached from the spool in posterior processes, e.g. extra printing. This can cause difficulties in the various apparatuses associated with processing. Also, the developed strip of photographic film may be damaged (e.g. bad scratches or cracks may be formed) while punching hole sin the trailer. If such a damaged film is wound up fully in the preserving cassette, the cracks and the like in the photographic film cassette may cause the leader would within the preserving cassette to fail to be advanced outward therefrom when the spool is rotated in the unwinding direction.

Also, the conventional photographic film strip provided with the take-up holes and entering perforations must be used with a camera having a detector circuit for discriminating the perforations from the take-up holes. The detector circuit requires an ID or the like and thus the camera is expensive.

The camera for use with the photographic film strip having a recording area also has disadvantages in that the positioning of relevant structures is complicated. The use of the metering perforations of the photographic film strip requires a photo sensor disposed in the camera for detecting them. The use of the magnetic recording area requires a magnetic head in the camera for recording and/or reading data. the photo sensor and the magnetic head are arranged around the exposure aperture of the camera, along with an autofocus (AF) device, a portion of a viewfinder, and a mechanism for transmitting the photographic film strip. Accordingly, incorporation of the photo sensor adapted to the metering perforations and the magnetic head in the camera requires the camera to be large. The same problem remains when the magnetic head is replaced with an LED.

SUMMARY OF THE INVENTION

In view of the foregoing problems, an object of the present invention is to provide a photographic film strip which can be easily contained in a preserving cassette after development.

Another object of the present invention is to provide a photographic film strip in which metering perforations can be detected without the need for a complex circuit in a camera.

Still another object of the present invention is to provide a photographic film strip on which data can be recorded by a camera which is compact.

In order to achieve the above and other objects and advantages of this invention, at least one first anchoring hole is formed in the trailer near a distal edge thereof, to be anchored on a spool of the cassette. At east one second anchoring hole is formed in a position deviated from the first anchoring hole toward the leader. The photographic film strip, therefore, can be easily contained in a preserving cassette after development.

In a preferred embodiment, at least one first take-up holes is formed in the leader near the distal edge thereof and near one lengthwise edge thereof, to be engaged with a take-up spool of a camera. At least one second take-up hole is formed in a position deviated from the first take-up hole toward the trailer.

In another preferred embodiment, a train of perforations are formed at a constant interval to be detected by a camera in order to detect positions of original frames to be created. A plurality of take-up holes are formed in the leader at an interval smaller than the interval of the perforations, to be caught by a claw of a take-up spool of the camera for taking up the leader. The take-up holes are formed in positions deviated from the perforations with respect to a widthwise direction of the leader. The metering perforations can thus be detected by a camera without the need for a complex circuit.

In a further preferred embodiment, a data recording portion for recording data is formed along one lengthwise edge of the photographic film strip. One spool end of the spool on a side opposite to the one lengthwise edge is driven by the camera. the data, therefore, can be recorded on the photographic film strip by a camera which is compact.

The novel camera to be loaded with the novel photographic film cassette has a cassette chamber for loading the photographic film cassette therein. A drive mechanism is disposed in the cassette chamber as to be engaged with the one spool end on the side of the train of perforations, in order to rotate the spool. A data recording head records the data on to the data recording portion, and is disposed opposite to the drive mechanism with respect to an exposure aperture.

BRIEF DESCRIPTION OF THE DRAWINGS

The above objects and advantages of the present invention will become more apparent from the following detailed description when read in connection with the accompanying drawings, in which:

FIG. 12 is an explanatory view structurally illustrating a camera according to the fifth embodiment; and FIG. 13 is a plan view illustrating the photographic film strip of FIG. 10, as exposed in the camera of FIG. 12 and as developed.

DETAILED DESCRIPTION OF THE PREFERRED EMBODIMENTS

Figure 1:
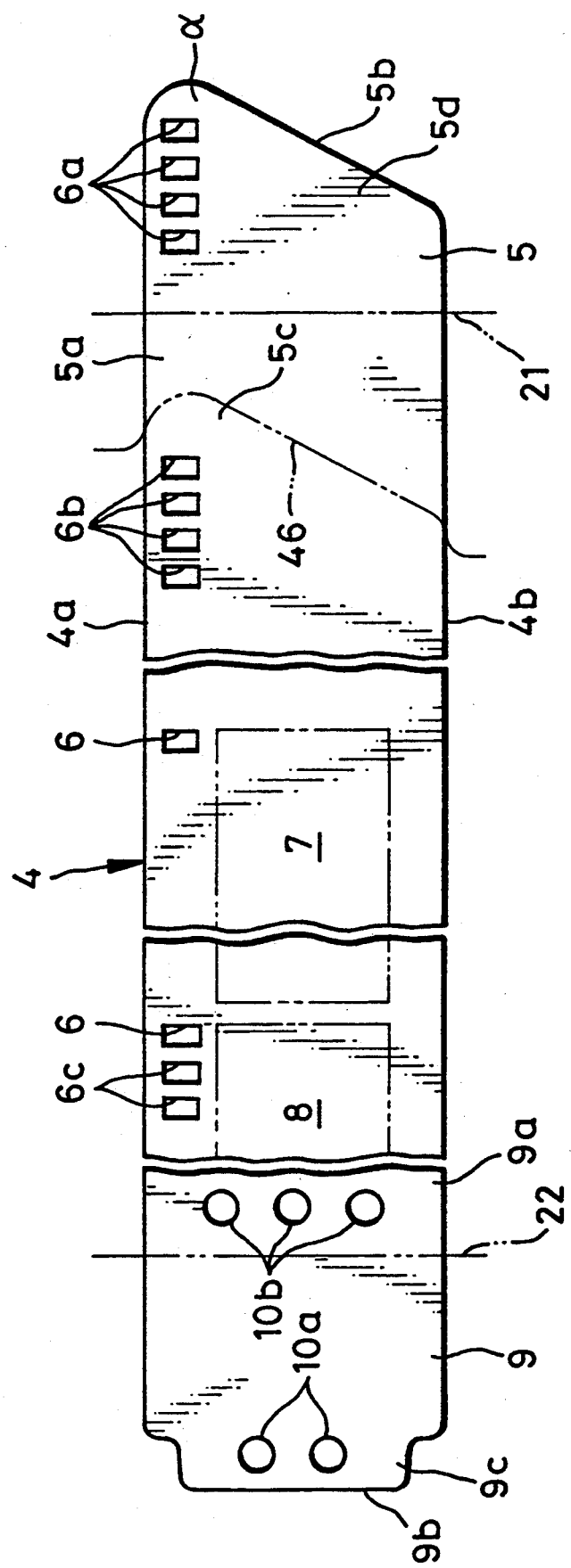
FIG. 1 is a plan view illustrating a photographic film strip according to the first embodiment.

In FIG. 1 illustrating photographic film strip 4 according to the first embodiment, a leader 5 of the photographic film strip 4 has a first group of four take-up holes 6a arranged along one lengthwise edge 4a and near a distal edge 5b of the leader 5. A second group of four take-up holes 6b is arranged at a predetermined distance from the first group of take-up holes 6a.

The first group of take-up holes 6a is adapted to allow detection of the leader 5 of the photographic film strip 4 as loaded in a camera, and to allowing the leader 5 to be captured on a take-up spool 2 (see FIG. 7) of the camera. The second group of take-up holes 6b is used when prints are made from the photographic film strip 4 in a photographic printer. A distal area 5d of the leader where the first group of take-up holes 6a is formed is cut off before the photographic film strip 4 is developed in a photographic film processor after it has been exposed. Accordingly, the photographic film strip 4, as developed, lacks the first group of take-up holes and the second group of take-up holes 6b substitutes for the former for allowing detection of the leader 5a and allowing it to be captured on an external take-up member of a machine for processing a developed strip of photographic film.

In addition to the groups of take-up holes 6a and 6b, the photographic film strip 4 is provided with a train of metering perforations 6 formed at a predetermined pitch corresponding to a respective original picture frame to be recorded on the photographic film strip 4. Also two additional perforations 6c are provided immediately following the final one of the perforations 6 so as to indicate to the camera that a final original frame is positioned at an exposure position.

A first group of anchoring holes 10a is formed in a trailer 9 of the film strip 4 along a trailer distal edge 9b and in a narrowed area 9c defined between two recesses formed in the trailer 9. The first group of anchoring holes 10a is adapted to allowing the trailer 9 to be anchored on a rotatable spool 13 of a photographic film cassette 12 (see FIG. 2). A second group of anchoring holes 10b is formed along a width of the trailer 9 at a predetermined distance from the distal edge 9b, and is adapted to allowing the trailer 9 to be anchored on a rotatable spool 31 of a preserving cassette or return cassette 30 after development (see FIG. 3). The position of the second group of anchoring holes 10b is predetermined so that it is exposed to the outside when the photographic film strip 4 is fully drawn out of the photographic film cassette while still being anchored to spool 13. The leader distal edge 5b is slanted so that an end α corresponding to the first group of take-up holes 6a is projected most largely. A lengthwise edge 4b of the photographic film strip 4, does not have perforations formed therein.

Figure 2:
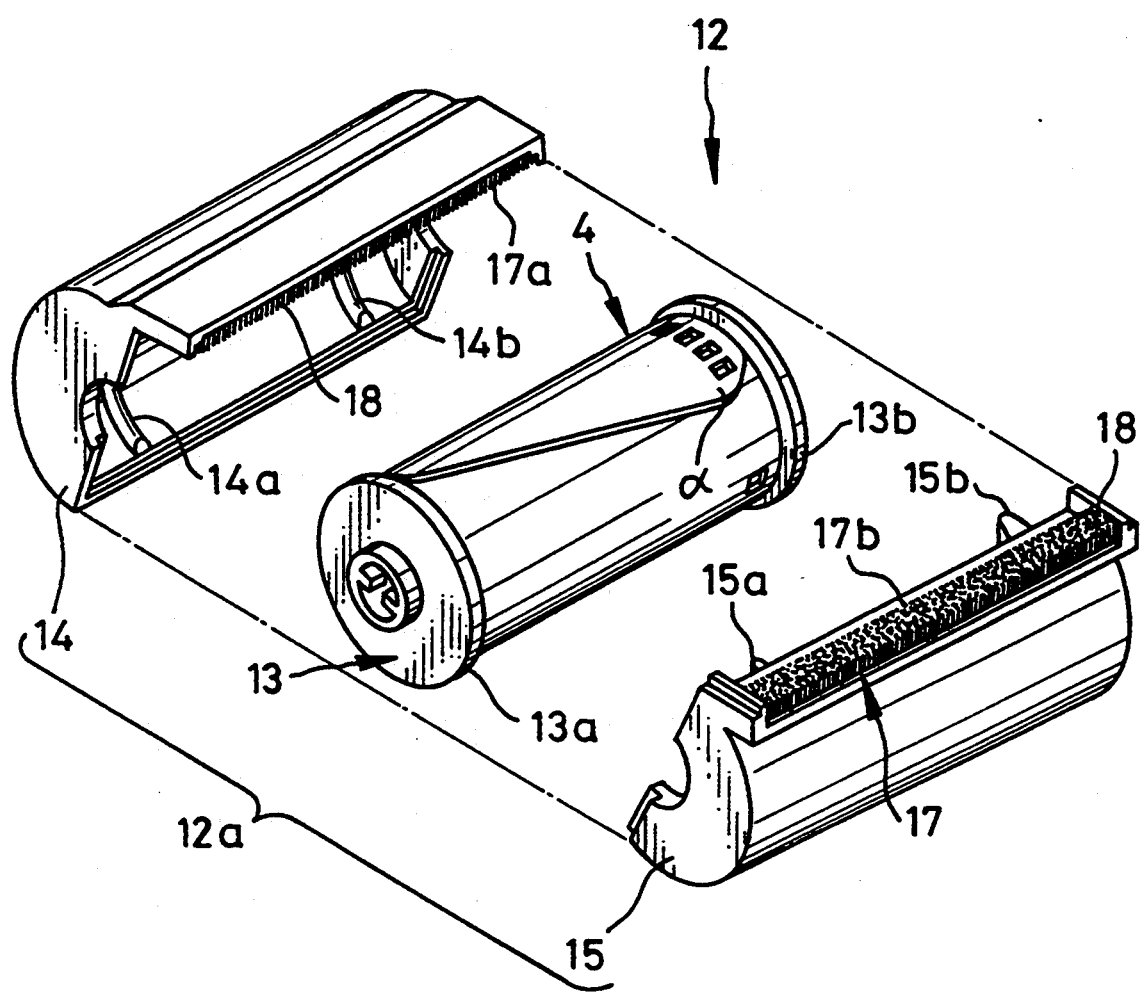
FIG. 2 is an exploded perspective view illustrating a photographic film cassette containing the unexposed strip of photographic film.

FIG. 2 illustrates the photographic film cassette 12, which is constituted of the photographic film strip 4 and a cassette for containing it before exposure. The cassette is constituted of a cassette shell 12a and the spool 13 rotatably contained therein. Two cassette halves 14 and 15 constitute the cassette shell 12a, and are both molded from resin having light-shielding characteristics. The cassette halves 14 and 15 have tongues 17a and 17b which define a passageway 17 in the cassette. Opposite faces of the tongues 17a and 17b are provided with plush 18 for preventing light from entering the cassette through passageway 17.

Arcuate ridges 14a, 14b, 15a and 15b are integrally formed on the cassette halves 14 and 15 so as to come into contact with the outside of a roll into which the photographic film strip 4 is wound so as to prevent the roll from loosening. A tip of the ridge 15b defines a separator claw, which projects so as to be in constant contact with the roll wound within the cassette shell 12a around the spool 13, thus separating the projected end α of the leader 5 from the roll to direct it to the passageway 17 when the spool 13 is rotated in the direction of unwinding the photographic film strip 4.

The operation of the photographic film strip is described below. The trailer 9 of the unexposed strip 4 of photographic film strip is inserted in a slot in the spool 13 and anchored on the spool 13 by engagement between the group of first anchoring holes engaging projections formed in the slot. To take photographs, the photographic film cassette 12 loaded in a camera. The camera rotates the spool 13 in a direction to unwind the photographic film strip so as to advance the leader out of the cassette shell 12a disposed inside the camera. The camera, incorporating a construction for controlling transportation of the photographic film strip, detects the first group of take-up holes 6a of the photographic film strip 4 to determine that the leader 5 is successfully advanced out of the cassette shell 12a.

When the leader 5 is successfully advanced out of the cassette 12a, the photographic film strip 4 is transported until the first one of the metering perforations 6 is detected by the camera. The leader 5 is caught by a take-up claws 2a of the take-up spool 2 of the camera and wound up into a photographic film wind-up chamber defined in the camera (see FIG. 7). The camera detects the second group of take-up holes 6b to confirm the appropriate transportation of the photographic film strip 4, which is stopped when a first original frame is positioned on an exposure aperture 126 (see FIG. 11). The shutter is then released to expose the film and form a latent image on the first original frame. Upon each shutter release, one of the perforations 6 is detected to allow transportation of the photographic film strip 4 one frame at a time. Detection of the additional perforations 6c indicate to the camera that a final original frame 8 is positioned at the exposure aperture 126. After photographing the final frame 8, the camera rotates the spool 13 in reverse to rewind the photographic film strip 4 fully into the cassette shell 12a.

Figure 3:
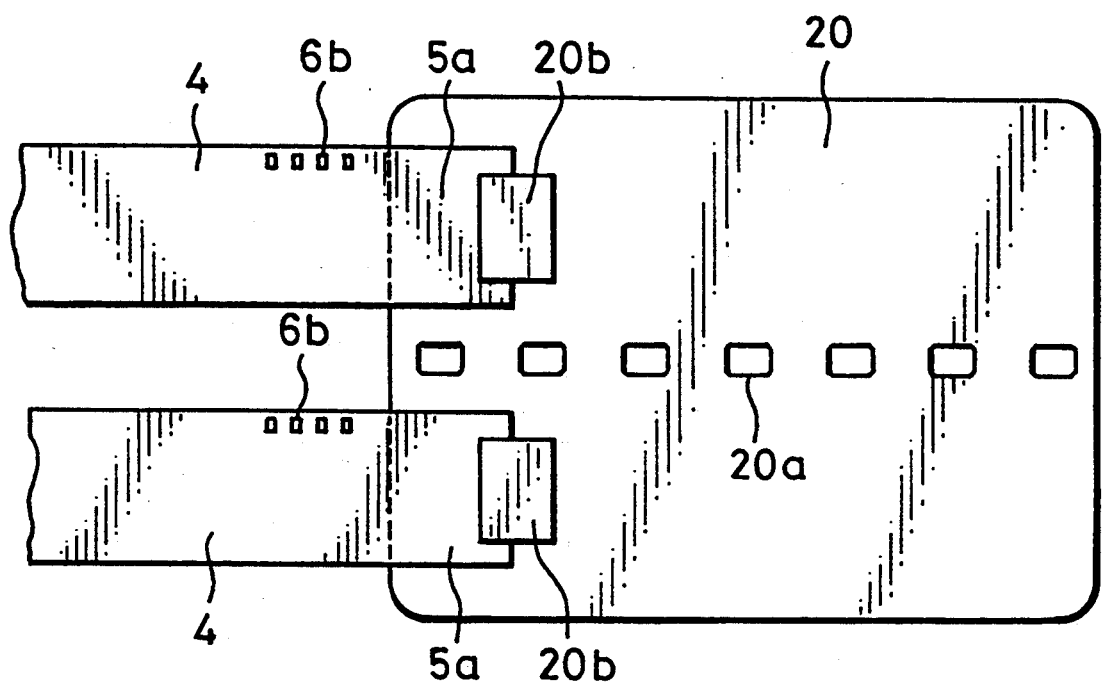
FIG. 3 is a plan view illustrating photographic film strips of the first embodiment spliced to a leader sheet.

The photographer or customer then forwards the photographic film cassette 12 containing the exposed film strip 4 to a photo laboratory, where an operator causes the leader 5 to exit from the cassette shell 12a, by rotating spool 13 in an unwinding direction, for preparation of the photographic film strip 4 for a developing process. The leader 5, as exited, is spliced to a leader sheet 20 as illustrated in FIG. 3. Before splicing the leader 5 to the leader sheet 20 with a splicing tape 10b, the leader 5 is cut straight along a line 21 represented by the two-dot-dash line indicated in FIG. 1. The area of the first group of take-up holes 6a is thus cut off and discarded, whereas the second group of take-up holes 6b remains on the film strip 4.

The photographic film cassette 12 is then loaded in a photographic film processor. Perforations formed in the leader sheet 20 are engaged with claws of a transporter which feeds it to the processor. The transportation of the leader sheet 20 draws the photographic film strip 4 from the cassette shell 12a until the full length of the photographic film strip 4 is drawn out. Then the trailer 9 is cut by a cutter to separate the photographic film strip 4 from the spool 13. The cutter cuts the trailer 9 along a line 22, represented by the two-dot-dash line in FIG. 1, which is close to the second group of anchoring holes 10b and between the first and second groups of anchoring holes 10a and 10b, to obtain a shortened trailer 9a. The photographic film processor automatically processes the photographic film strip 4 as exposed, with the leader sheet 20 being advanced therethrough to develop the photographic film strip 4.

Figure 4:
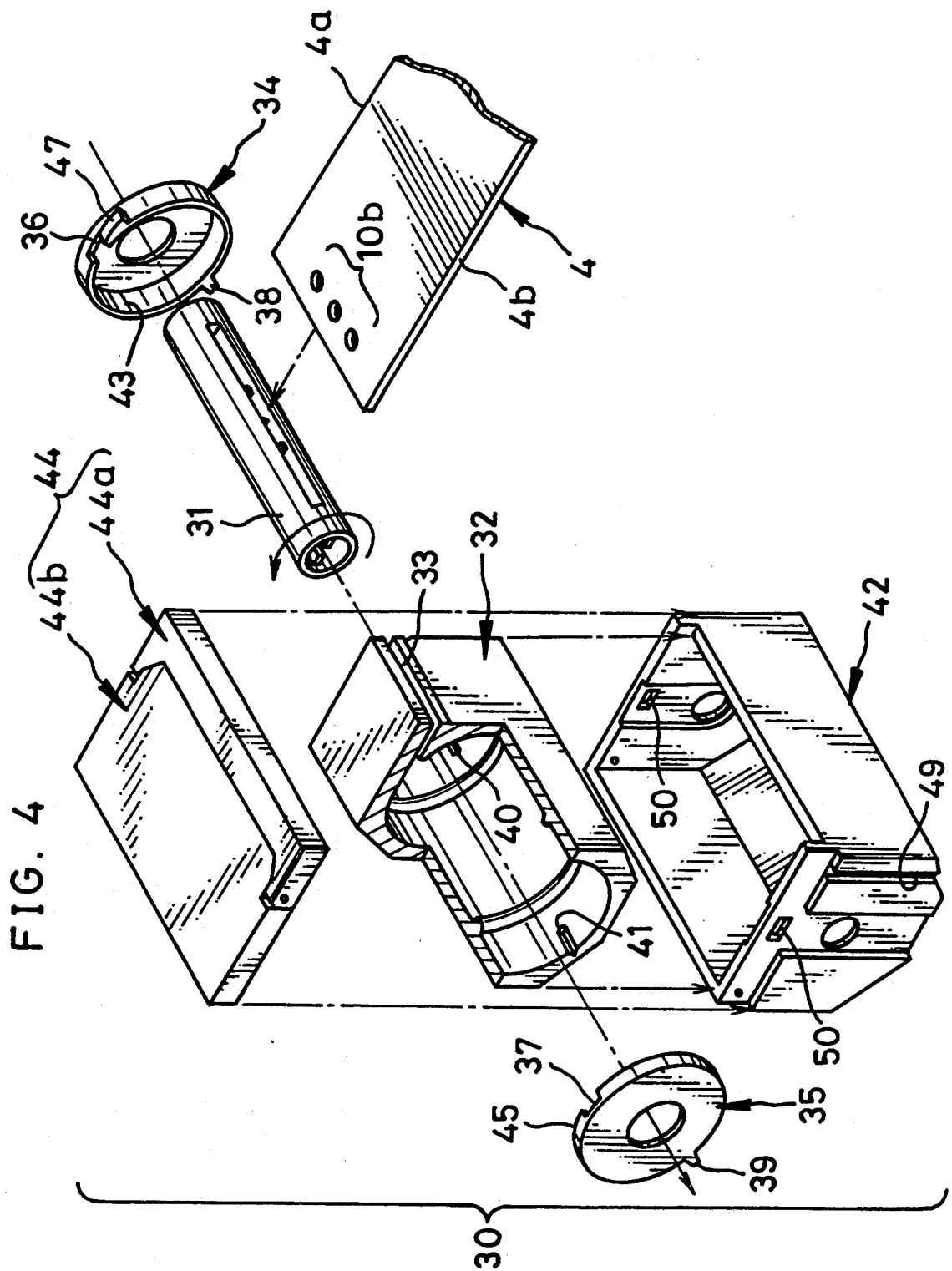
FIG. 4 is an exploded perspective view illustrating a preserving cassette for containing the developed strip of photographic film.
Figure 5:
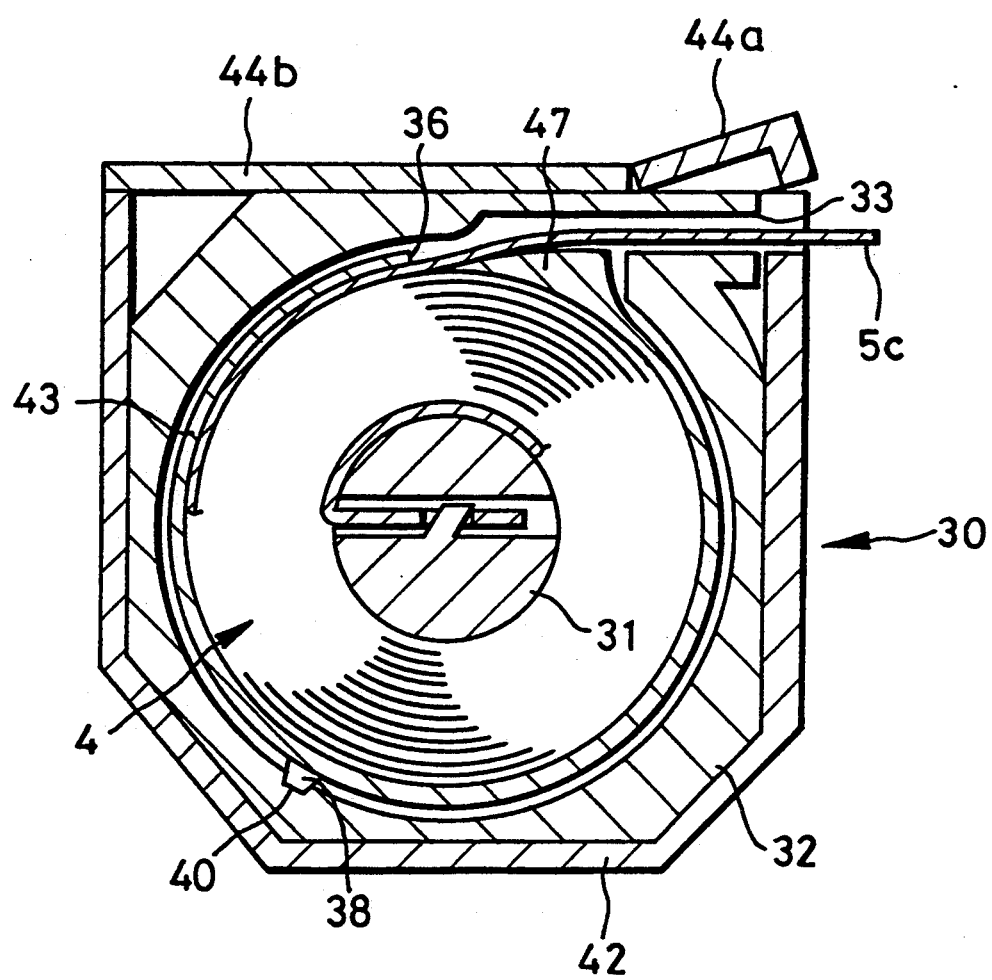
FIG. 5 is a cross section illustrating the preserving cassette together with the photographic film strip.

The developed strip 4 of photographic film is disposed the preserving cassette 30 after photoprints have been made. As illustrated in FIGS. 4 and 5, the second group of anchoring holes 10b in the trailer 9a is engaged with anchoring projections formed in a slot in a spool core 31 so as to anchor the photographic film strip 4 on the core 31. The core 31 is inserted axially in an internal casing 32, while the exposed photographic film strip 4 is inserted widthwise into a passageway 33. Disks 34 and 35 are fitted on both ends of the core 31. Then lengthwise edges 4a and 4b are received in cutoffs 36 and 37 formed in disks 34 and 35, respectively. Projections 38 and 39 of the disks 34 and 35 are fitted in grooves 40 and 41 formed in the internal casing.

The internal casing 32 thus assembled is inserted into an external casing 42. The core 31 is rotated in the rewinding direction or counterclockwise as indicated by the arrow in FIG. 4, to rewind the photographic film strip onto the core 31. The outermost turn of the roll of the photographic film strip 4 is pressed by circumferential lips 70 and 71 so that the diameter of the roll around the core 31 is reduced to prevent the roll from loosening. When most of the photographic film strip 4 is wound up into the preserving cassette 30, the leader 5a is further cut into the preserving cassette 30, the leader 5a is further cut of a line 46 represented by the two-dot-dash line in FIG. 1 to form further shortened leader 5c. The manner of cutting the leader 5a into the leader 5c is similar to the initial distal edge 5b, and is accomplished such that the second group of take-up holes 6b is close to a distal edge of the shortened leader 5c.

A door assembly 44 constituted of a passage door 44a and a casing door 44b is provided on the external casing 42. The leader 5c is fully wound up in to the preserving cassette 30, to complete insertion of the photographic film strip 4 into the cassette 30, which may be returned to the customer or stored by the photo lab. Note that the right-hand edge of the cutoff 36 is tapered so as to define a separator 47 which abuts upon the leader 5c for separating it from the inner roll.

Figure 6:
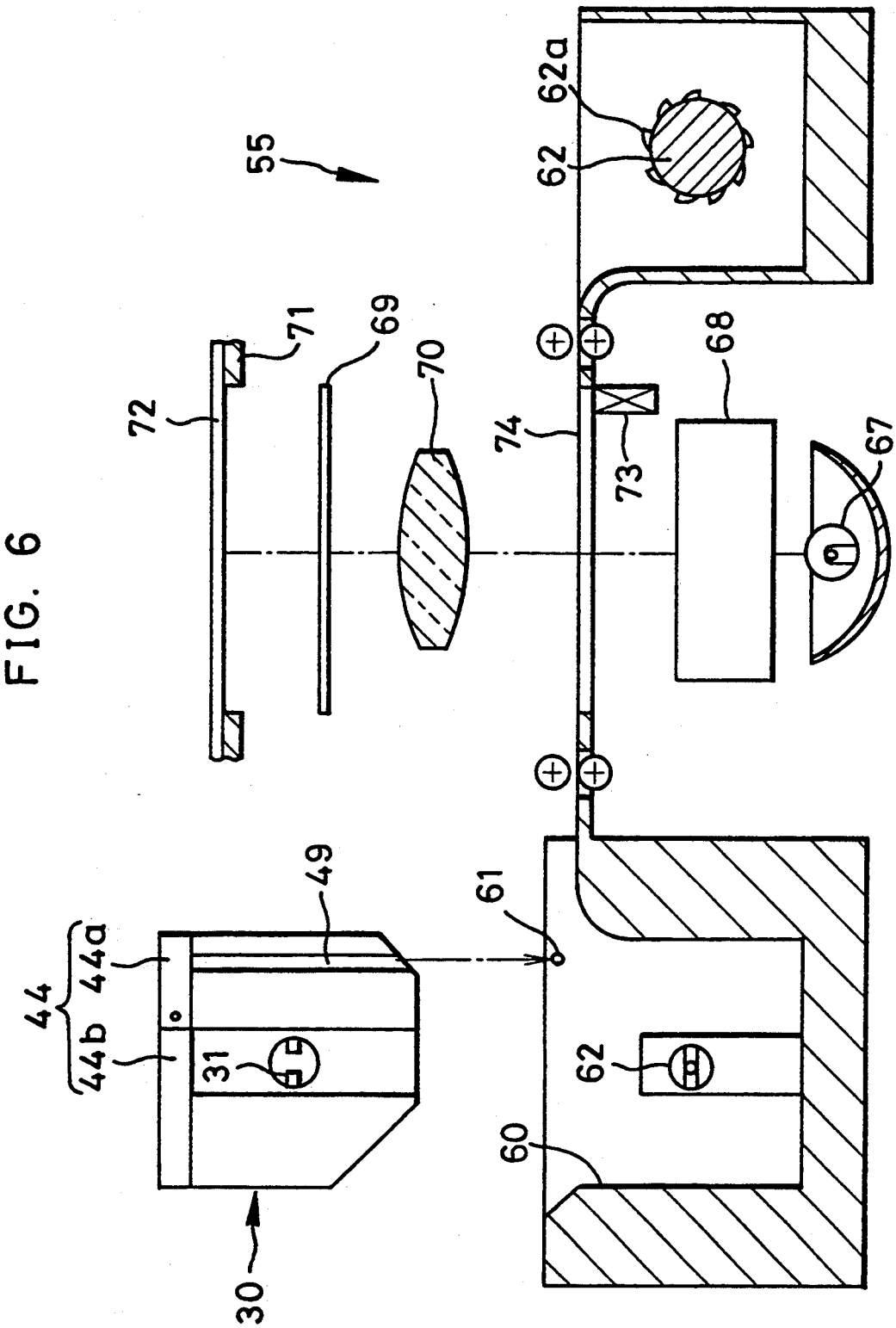
FIG. 6 is an explanatory view illustrating a printer processor for use with the preserving cassette.

FIG. 6 schematically illustrates a printer processor 55 which is adapted to making photoprints from the photographic film strip 4 contained in the preserving cassette 30, which is forwarded to the photo laboratory when additional prints are desired. When the cassette 30 is loaded in a cassette holder 60, a pin 61 of the printer processor 55 is inserted in a groove 49 to push open the passage door 44a as illustrated in FIG. 5. The casing door 44b is kept from opening, as claws (not shown) formed thereon are caught in slots 50 in the external casing 42.

A drive shaft 62 is engaged with the spool 31 and rotates it in the unwinding direction. When the leader 5c approaches the cutoffs 36 and 37, the separator 47 separates and directs the leader 5c to the passageway 33. The leader 5c is transported along a passage 74, until the second group of take-up holes 6b is caught by take-up claws 62a so as to wind up the photographic film strip 4 onto a take-up spool 62 of the printer processor 55. The take-up spool 62 is driven to feed the photographic film strip 4.

When photoprints are made, a lamp 67 emits light, which is adjusted by a light adjuster 68 having a diffusing box and color correction filters, to illuminate the original frames as desired. A shutter 69 is operated to expose photographic paper 72 through a printing lens 70 and a paper mask 71 for a predetermined exposure time. The original frames are detected by a detector device 73 which detects the second group of take-up holes 6b, the perforations 6 and the additional perforations 6c in a manner similar to the camera described above. After printing, the spool 31 is rotated by the drive shaft 62 in the rewinding direction to rewind the exposed strip 4 of photographic film into the preserving cassette 30. When the cassette 30 is unloaded from the holder 60, the passage door 44a is closed.

The photographic film strip 4 according to the first embodiment is applied to the printer processor 55. However, the same film strip can be applied to other external apparatuses, e.g. a video player having a pick-up device, a COD for reading images from the original frames 7, 8 of the exposed strip 4 of photographic film to display the images CRT.

Figure 7:
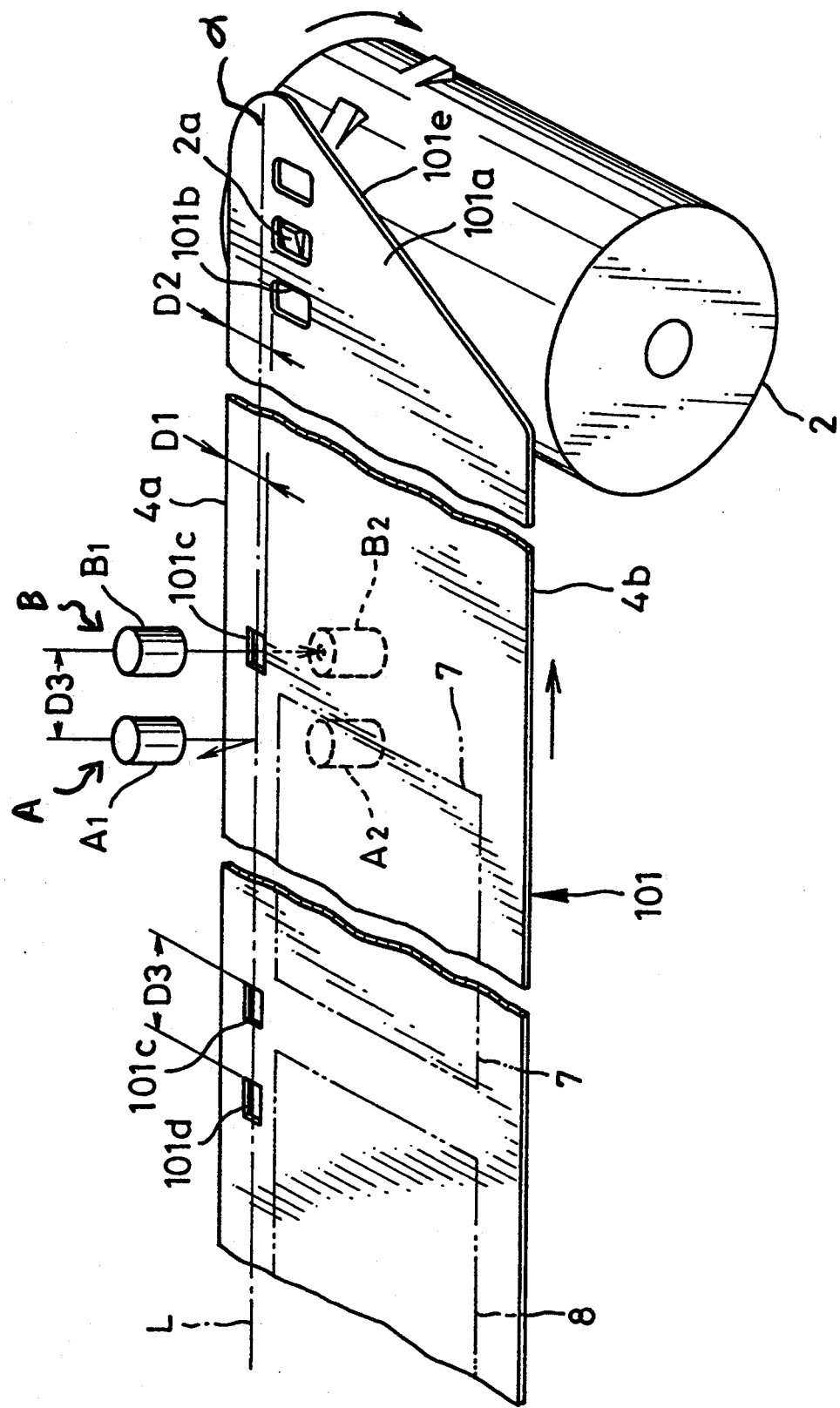
FIG. 7 is an explanatory view illustrating a state where a take-up spool of a camera takes up take-up holes of a photographic film strip according to the second embodiment.
Figure 8:
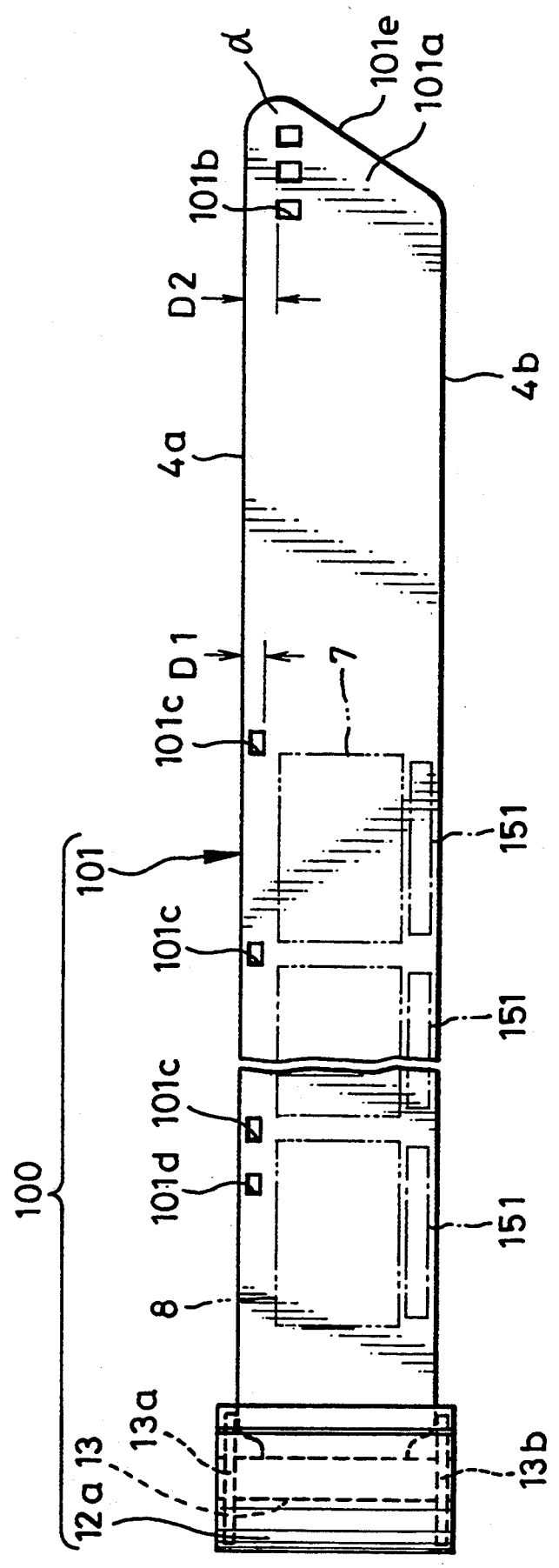
FIG. 8 is a plan view illustrating a novel photographic film cassette out of which the photographic film strip of FIG. 7 is fully drawn.

In the photographic film strip 4 of the first embodiment, the take-up holes 6a and 6b are formed in alignment with the perforations 6, and thus a relatively complicated detector is required in the camera. FIGS. 7 and 8 illustrate a second embodiment which solves this problem. Elements similar to those of the first embodiment are designated with like reference numerals. The film strip of the second embodiment can be loaded in a cassette similar to that described in connection with the first embodiment. A photographic film strip 101 of a photographic film cassette 100 has a leader 101a, and group of take-up holes 101b formed in the leader 101a for engagement with the claws 2a of the take-up spool 2 of a camera. Perforations 101c are formed along the lengthwise edge 4a of film strip 101 in correspondence with original frames 7.

The perforations 101c are formed to be closer to the lengthwise edge 4a than the take-up holes 101b. Let D1 be a distance between the inner side of the perforation 101c and the edge 4a, and let D2 be an interval between the outer side of the holes 101b and the edge 4a. The perforations 101c and the holes 101b are formed of predetermined positions such that D1<D2. The camera has a passage for the photographic film strip 101. Two photo sensors A and B are disposed in the passage for detecting original frames of the photographic film strip 101. The sensor A is constituted of a light projector A1 and a light receptor A2, while the sensor B is constituted of a light projector B1 and a light receptor B2. The photographic film strip 101 is scanned by light beams of the sensors A and B along a center line L of the train of the perforations 101c. The sensors A and B thus detect the perforations 101c but will not detect the holes 101b.

During transportation of the photographic film strip 101, the sensor A detects the initial one of the perforations 101c and is turned on. Upon this detection, the camera decelerate the transportation of the photographic film strip 101. Then the sensor A is turned off and the sensor B is turned on. Upon actuation of the sensor B, the photographic film strip 101 is stopped, position a frame 7 on the exposure aperture 126 (see FIG. 11). A counter for the photographic film strip 101 is incremented and displays a frame number corresponding to the additive number of the counter. In addition to the single perforations 101c, one perforation 101d is formed outside the final original frame 8 at an interval D3 from perforation 101d, which is equal to the interval between the sensors A and B. Thus, the final frame 8 is set on the exposure aperture 126, both sensors 4 and 5 are actuated simultaneously, and therefore detection of the final frame 8 is indicated to the camera. Immediately after exposing the final frame 8, the photographic film strip 101 is rewound. The operation of the sensors A and B and an associated controller of the camera is briefly referred to in Table 1 below:

TABLE 1

| | | A | |
|---|---|---|---|
| | | ON | Off |
| B | ON | Final frame detected | Stop transporting |

TABLE 1-continued

| | A | |
|---|---|---|
| | ON | Off |
| OFF | Decelerate transportation | None |

The operation of the photographic film strip 101 is described below. The projected end α of a distal edge 101e of the leader 101a is separated by the separator 15b, and is directed outward via the passageway 17 to the outside of the cassette shell 12a of the photographic film cassette 100 (see FIG. 2). When the leader 101a advances along a passage in the camera, the take-up holes 101b pass beside the scanning positions of the sensors A and B. In other words, the holes 101b are deviated from the line L where beams are applied from the sensors A and B. Accordingly, three is no interaction between the take-up holes 101b and the sensors A and B.

When the initial one of the perforations 101c comes to a position opposite the sensor A, the sensor A is turned on to decelerate the transportation of the photographic film strip 101. Further winding of the photographic film strip 101 brings the perforation 101c away from the sensor A to turn it off, and brings the perforation 101c to a position opposite the sensor B to turn it on. Immediately the take-up spool 2 is stopped from rotating so as to position an initial one of the original frames 7 on the exposure aperture 126.

When the final one of the perforations 101c comes on to a position opposite the sensor A, it is turned on to decelerate the transportation of the photographic film strip 101. The additional perforation 101d is placed opposite the sensor A, at the same time that the final perforation 101c is opposite the sensor B. In such case, sensors A and B are turned on. The photographic film strip 101 is then stopped to position the final frame 8 on the exposure aperture 126. When the final frame 8 has been exposed, a sequence for rewinding the photographic film strip 101 is carried out.

The camera for this embodiment begins decelerating the transportation a predetermined distance before stopping the transportation in order to improve the precision in the position of stopping the photographic film strip 101, however, may be abruptly stopped upon detecting the perforation 101c on the sensor A, as illustrated in Table 2 below.

TABLE 2

| | | A | |
|---|---|---|---|
| | | ON | OFF |
| B | ON | Final frame detected | None |
| | OFF | Decelerate transportation | None |

Although the perforations 101c are closer to the edge 4a than the holes 101b, the latter may be closer thereto than the former.

Figure 9:
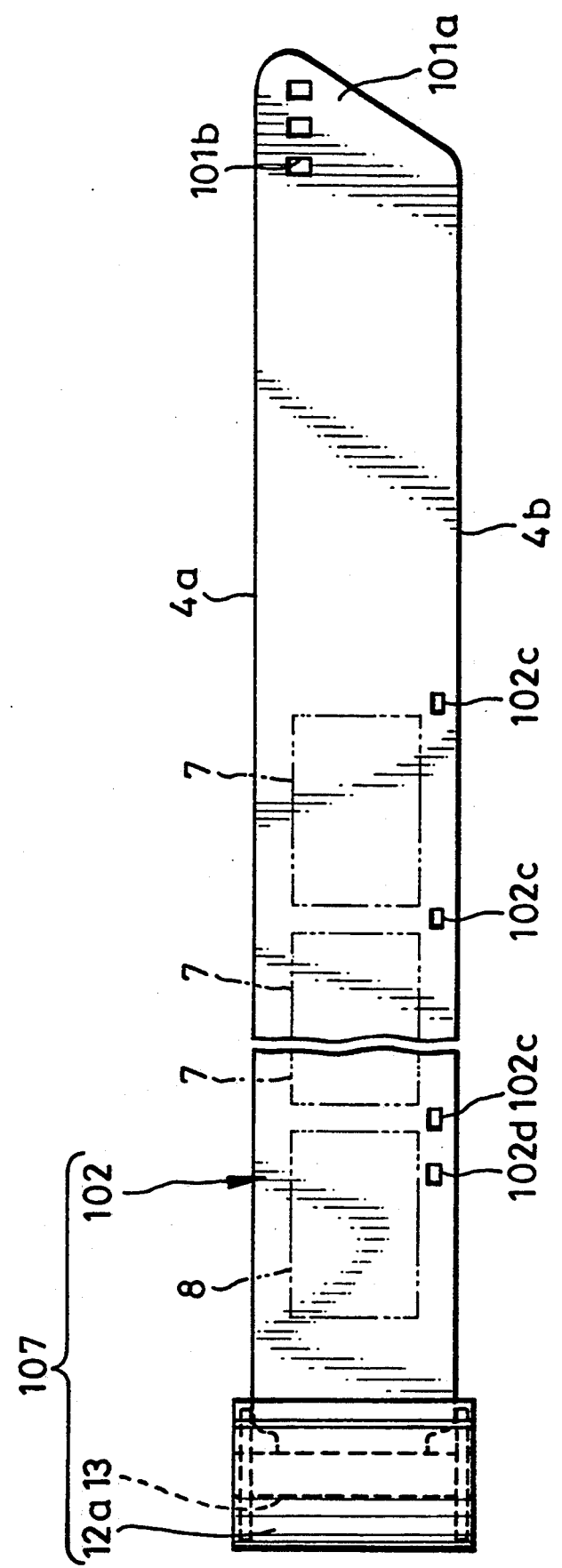
FIG. 9 is a plan view illustrating a photographic film strip of the third embodiment.

FIG. 9 illustrates a third preferred embodiment of photographic film cassette 107 having a photographic film strip 102, in which perforations 102c, 102d are formed in film strip 102 on the side of the edge 4b which is opposite to the edge 4a along which the holes 101b are formed. The photo sensors A and B, instead of including a light projector and a light receptor, may be other sensing structures such as mechanical switches having a movable contact member. Also, the photo sensors A and B are positioned so as to correspond to edge 4b. Instead of the additional perforation 102d for detection of the final frame 8, two perforations may be formed such that they are formed downstream from the final perforation 102c, are different in position from the perforation 101d, and are spaced one from another at an interval D3.

Figure 10:
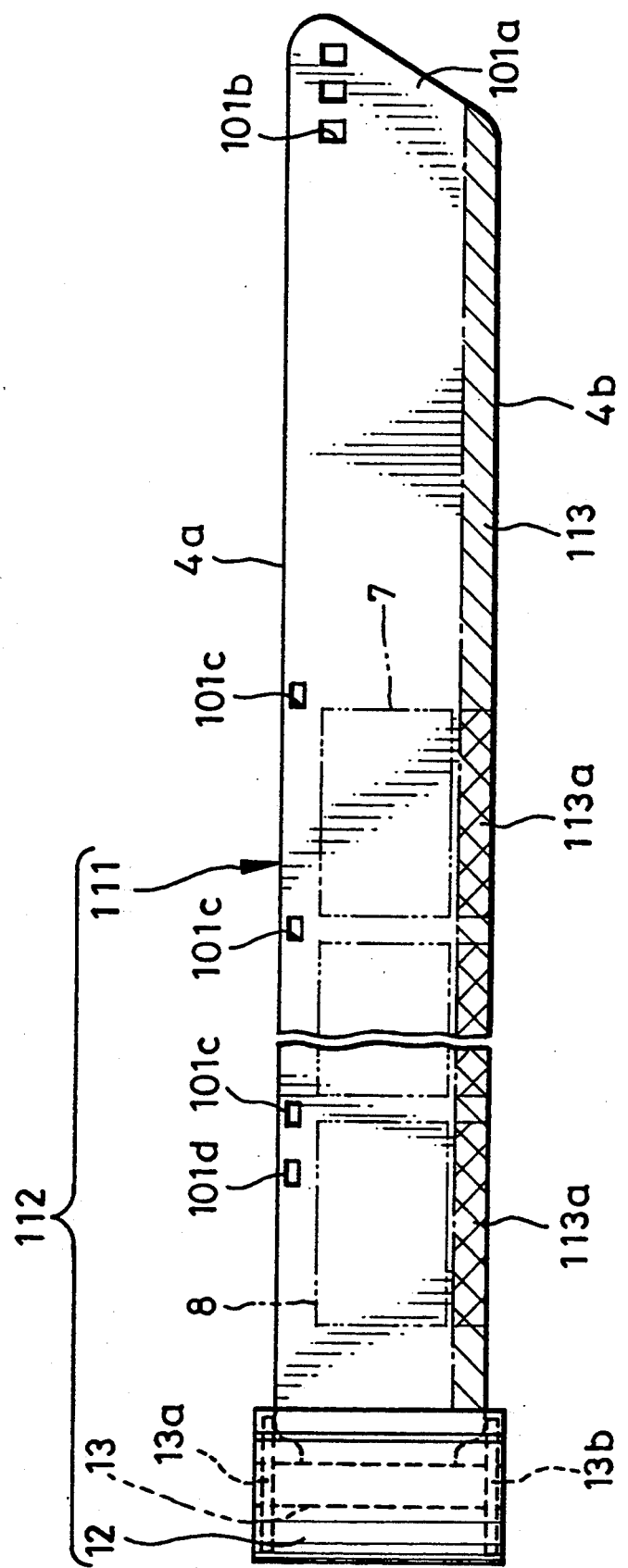
FIG. 10 is a plan view illustrating a novel photographic film strip having a magnetic recording area according to a fourth embodiment.
Figure 11:
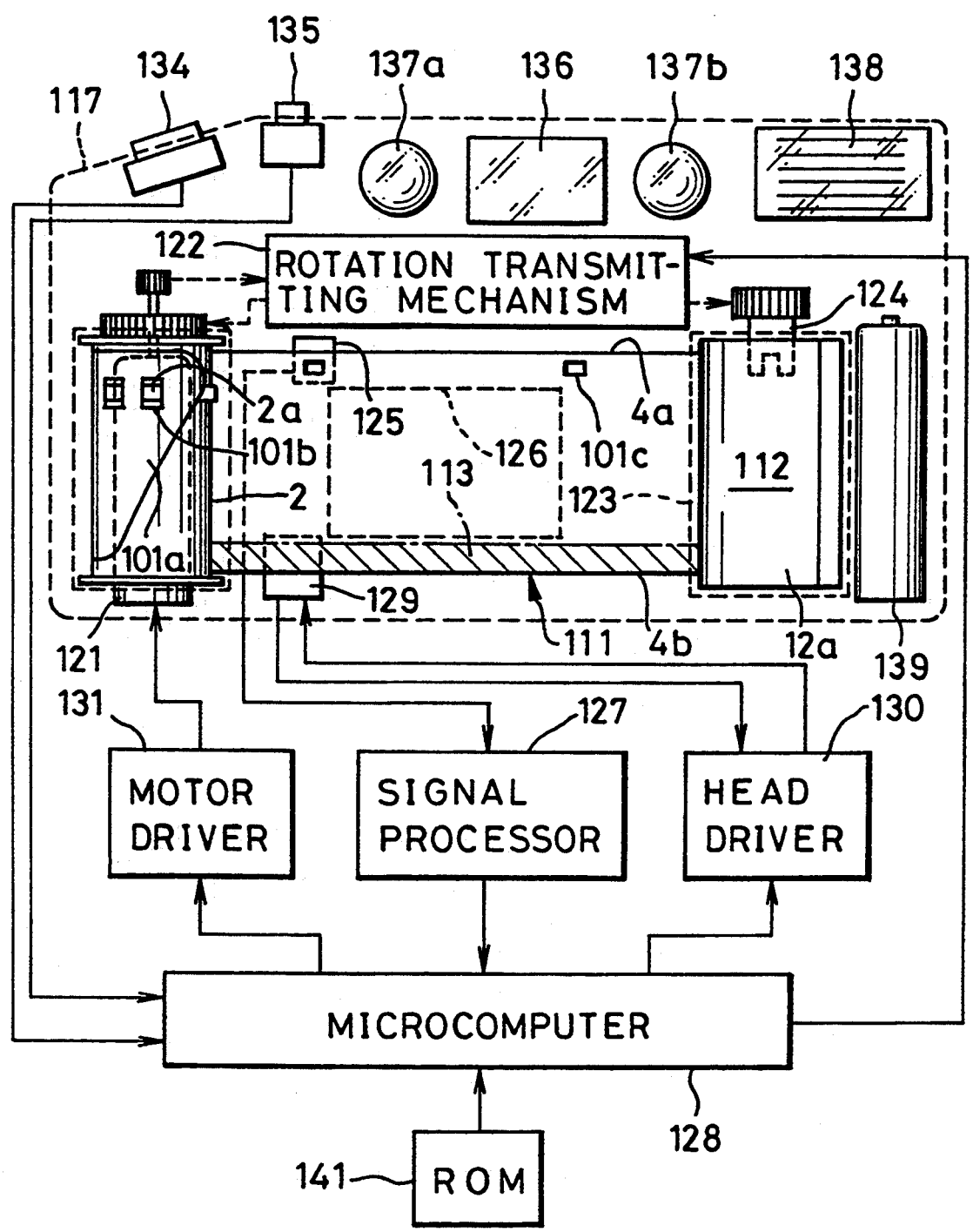
FIG. 11 is an explanatory view structurally illustrating a camera having a magnetic recording head.

A fourth preferred embodiment of photographic film strip 111 is illustrated in FIG. 10. The photographic film strip 111 has, the take-up holes 101b and the perforations 101c along the lengthwise edge 4a, as well as a magnetic recording area 113 along the opposite edge 4b. FIG. 11 illustrates a camera 117 for use with film strip 111. A motor 121, drives the take-up spool 2 and a drive shaft or fork 124 via a rotation transmitting mechanism 122. The fork 124 is engaged with and rotates one spool end 13a of the spool 13 when a photographic film cassette 112 is loaded in a cassette chamber 123.

When the cassette chamber 123 is loaded with the photographic film cassette 112, the perforations 101c are arranged so as to correspond to the side of the fork 124, and the recording area 113 is arranged on the lower side of the camera 117. A photo sensor 125 for detecting the perforations 101c is disposed in the vicinity of the upper side of the exposure aperture 126. The photo sensor 125 supplies a detecting signal for a signal processor 127, which processes the signal and enters it in a microcomputer 128.

A magnetic recording head 129 is disposed near the lower side of the exposure aperture 126 and is adapted to magnetically record photo-taking data, which relates to creation of the original frames 7, e.g., pseudo-zooming data, onto recording sections 113a of the recording area 113 of the photographic film strip 111. Note that pseudo-zooming photography is a system in which a portion of an original frame on an exposed strip of photographic film is enlarged and printed by a printer to obtain a photoprint in which a subject is zoomed in. The pseudo-zooming data consists of a magnification factor of enlargement during printing. A head driver 130 interfaces the head 129 to the microcomputer 128 for driving the head 129.

A shutter release button 134, and a pseudo-zooming button 135 for changing selectively a pseudo-zooming magnification are disposed on the camera 117. When depressed one time, the pseudo-zooming button 135 sets the magnification to "1.4-power". When depressed twice, the button 135 sets it to "2-power". When depressed a third time, the button 135 returns the camera 117 to "one-power" or standard photography. The selection of the pseudo-zooming magnification is canceled after each exposure and is reset to the one-power magnification. Note that the magnification corresponds to a virtually changeable focal length of a taking lens of the camera 117 corresponding to desired zoom condition. One-power, for example, would correspond to a 38 mm focal length, 1.4-power to 53 mm, and 2-power to 76 mm. A viewfinder 136, of which an eyepiece (not shown) has finder field frames to be displayed selectively in correspondence with the pseudo-zooming magnifications is also provided. Reference numerals 137a and 137b designate range finding windows adapted to an autofocus (AF) device of the camera 117. A flash emitting lamp 138 is arranged beside the window 137b. A battery 139 is loaded in the camera 117 beside the cassette chamber 123.

The release button 134 and the pseudo-zooming button are connected to the microcomputer 128, which controls the head driver 130 according to depression of the pseudo-zooming button 135, for driving the magnetic head 129. The microcomputer 128 further controls transportation of the photographic film strip 111 in accordance with a programmed sequence stored in a ROM 141.

The camera 117 as constructed above has a comparatively small height due to an arrangement in which the rotation transmitting mechanism 122 is disposed opposite to the magnetic head 129 with respect to the passage of the photographic film strip 111 because no extra space on the upper side of the passage is needed for the magnetic head 129. The disposition of the photo sensor 125 on the upper side is also convenient for allowing the magnetic head 129 to be arranged on the lower side.

The operation of the photographic film strip 111 and the camera 117 will now be described. When the camera 117 is loaded with the photographic film strip 111, the spool 13 is engaged with the fork 124. When a back door of the camera 117 is closed, the microcomputer 128 drives the motor 121 via the motor driver 131, and supplies the rotation transmitting mechanism 122 with a command to rotate the take-up spool 2 and the fork 124. The leader 101a is exited from the cassette shell 12a and advanced through the passage to the take-up spool 2. The take-up holes 101b are caught by the claws 2a, then the take-up spool 2 draws up the photographic film strip 11, while the fork 124 is rotated along with the movement of the photographic film strip 111. When the initial perforation 101c is detected by the photo sensor 125, the movement of the photographic film strip 111 is stopped to position the initial original frame on the exposure aperture 126.

To conduct 1.4-power pseudo-zooming photography, the relevant button 135 is depressed once. The microcomputer 128 supplies the head driver 130 with a command, and causes the viewfinder 136 to display a 1.4-power field frame in the eye-piece. The photographer aims at a subject with the novel camera 117 via the viewfinder 136 by use of the finder field frame, and depresses the release button 134. The original frame 7, set on the exposure aperture 126, is exposed and the photographic film strip 111 is then transported further.

From the start of transporting the photographic film strip 111, an initial section of the recording sections 113a, next to the initial original frame, is placed in contact with the magnetic head 129, which writes the 1.4-power pseudo-zooming data on to the recording section 113a during transportation. The photographic film strip 11 is transported until the second perforation 101c is detected by the photo sensor 129. Upon this detection, the movement of the photographic film strip 111 is stopped. The initially selected 1.4-power magnification is canceled and the camera returns to one-power magnification. The second original frame is positioned to the exposure aperture 126 to stand by for the next exposure.

Such an exposure is repeated. After the final frame 8 is exposed, the additional perforation 101d is detected. The signal processor 127 thus recognizes the original frame 8 as a final frame, and supplies the microcomputer 128 with a final frame signal. The microcomputer 128, responsive to the signal, supplies the rotation transmitting mechanism 122 and the motor driver 131 with command to rewind the photographic film strip 111. After entire photographic film strip 111 is rewound into the cassette shell 12a, which is then forwarded to the photo laboratory. The operator of the laboratory processes the photographic film strip 111 and sets it in an auto printer incorporating a device for reading the magnetic recording section 113a. The auto printer detects the pseudo-zooming data as written in the magnetic recording section 113a to read out the magnification which the photographer previously intended for photoprinting. The enlargement of the printer is then set according to the magnification as detected, so as to make a photoprint in a zoom mode.

FIGS. 12 and 13 illustrate a fifth embodiment of the invention including film strip 101 and a camera 152 for use with the same. Elements similar to those of the above embodiment is designated with the reference numerals the same as them. The photographic film strip 101 is similar to that illustrated in FIGS. 7 and 8, and has an area 151 where data is recorded photographically or optically. The camera 152 for the photographic film strip 101 incorporates an LED 153 for emitting light to record photo-taking data on to the data-recording area 151. An LED driver 154 interfaces the LED 153 with the microcomputer 128, which supplies the driver 154 with a command to drive the LED 153.

Each time that the photographic film strip 101 is transported after an exposure, the LED 153 is activated according to the photo-taking data and records a bar code on to the section 151 in the form of a latent photographic image. With all exposures effected, the photographic film strip 101 is developed to render the bar codes 155 as well as the visible original frames 7, 8 visible (See FIG. 13). The photographic film strip 101 is then set in an auto printer incorporating a device for reading the bar codes 155. Printing conditions of the printer are set according to the photo-taking data represented by the bar codes 155, so as to make photoprints meeting the desired conditions.

The fork 124 and the rotation transmitting mechanism 122 as described above are disposed on the upper side of the exposure aperture 126. However, the camera may incorporate a fork and a rotation transmitting mechanism disposed on the lower side, and incorporate either a magnetic head or an LED disposed on the upper side. Instead of the bar codes 155 described above, photographically recorded data may be represented by a plurality of successive lines either spaced at various intervals or having various lengths. Instead of applying magnetic recording material only to the area 113, the magnetic recording material may be transparent and be applied to the entire back surface of a novel photographic film strip.

The photographic film strips of the embodiments are 35 mm color negative film. However, the invention may be applied to a reversal film or a film of any size and format. Also, the various features of the embodiments may be combined, interchanged or used in conjunction with each other.

Although the present invention has been fully described by way of the preferred embodiments thereof with reference to the accompanying drawings, various changes and modifications will be apparent to those having skill in the art. Therefore, unless otherwise these changes and modifications depart from the scope of the present invention, as defined by the appended claims, they should be construed as included therein.

What is claimed is:

1. A photographic device having a film strip which has a leader and a trailer and is adapted to be contained in a first cassette having a rotatable spool, comprising:
at least one first anchoring hole formed in said trailer at a position proximate a first distal edge of said trailer, said anchoring hole being adapted to be anchored on a spool of said first cassette; and at least one second anchoring hole formed in said trailer at a remote position which is deviated from said first anchoring hole in a direction toward said leader, said remote position being remote from said spool when said at least one first anchoring hole is anchored on said spool.

2. A photographic film device as defined in claim 1, wherein a narrowed portion of said trailer is defined at said first distal edge by recesses formed at both sides of said first distal edge, said first anchoring hole being formed in said narrowed portion.

3. A photographic film device as defined in claim 2, further comprising means for causing said film strip to be separated from said first cassette by a cut formed between said first and second anchoring holes for development, said second anchoring hole being anchored on a second spool in a cassette shell of a second cassette, said film strip being wound on said second spool after development.

4. A photographic film device as defined in claim 3, wherein said first and second cassettes comprise means for advancing said leader outward in response to rotation of said spool in an unwinding direction.

5. A photographic film device as defined in claim 4, wherein said at least one first anchoring hole comprises a plurality of holes arranged along said first distal edge of said trailer.

6. A photographic film device as defined in claim 5, herein said at least one second anchoring hole comprises a plurality of holes arranged across a widthwise direction of said trailer.

7. A photographic film device as defined in claim 1, further comprising:

at least one first take-up hole formed in said leader at a position proximate a second distal edge, which is opposite said first distal edge, of said leader and proximate one lengthwise edge thereof, said take-up hole being adapted to be caught by a take-up spool of a camera; and at least one second take-up hole formed in said leader at a position deviated from said first take-up hole in a direction toward said trailer.

8. A photographic film device as defined in claim 7, further comprising:

at least one perforation formed in said film strip corresponding to each original frame to be created, each of said perforations being disposed at a predetermined position with respect to an associated one of said frames.

9. A photographic film device as defined in claim 8, further comprising:

a plurality of additional perforations formed in said film strip in association with a final one of said original frames, a quantity of said first and second take-up holes being more than a quantity of said additional perforations.

10. A photographic film device as defined in claim 9, wherein said second distal edge is cut slantwise so as to cause a projection portion of said one lengthwise edge of said leader to project with respect to the other lengthwise edge thereof, said first take-up hole being formed near said projecting portion.

11. A photographic film device as defined in claim 10 further comprising, means for cutting said strip between said first and second take-up holes so as to allow a leader sheet to be spliced to said leader for development and printing.

12. A photographic film device as defined in claim 11, wherein said cutting means cuts said film strip slantwise so as to define a second projecting position proximate said one lengthwise edge.

13. A photographic film device as defined in claim 12, wherein said first and second take-up holes are formed on a same side of said leader with respect to a widthwise direction of said leader.

14. A photographic film strip as defined in claim 13, wherein said perforations are disposed along a first line which extends along the length of said film strip and said first and second holes are disposed along a second line, said first and second lines being offset from one another in a widthwise direction of said film strip.

15. A process for handling a photographic film comprising the steps of:

winding said film on a first spool which is rotatably contained in a first cassette, at least one first anchoring hole formed in a first distal end of said film being anchored on said first spool, at least one second anchoring hole being formed in said first distal end at a position which is deviated from said first anchoring holes in a direction towards a second distal end of said film which is opposite said first distal end, said at least one second anchoring hole being remote from said spool.

16. A process as claimed in claim 15, wherein a narrowed portion is formed at said first distal end by recesses formed at both sides of said first distal end, said first anchoring hole being formed in said narrowed portion.

17. A process as claimed in claim 16, further comprising the step of:

unwinding said film by rotating said first spool in an unwinding direction so as to advance said film out of said first cassette;

separating said film from said first cassette by cutting said film at a position between said first and second anchoring holes;

developing said film;

anchoring said second anchoring holes on a second spool which is rotatably contained in a second cassette; and winding said film onto said second spool.

* * * * *